P. S. CRAWFORD.
Raking Attachment for Harvesters.
No. 21,552.                                    Patented Sept. 21, 1858.
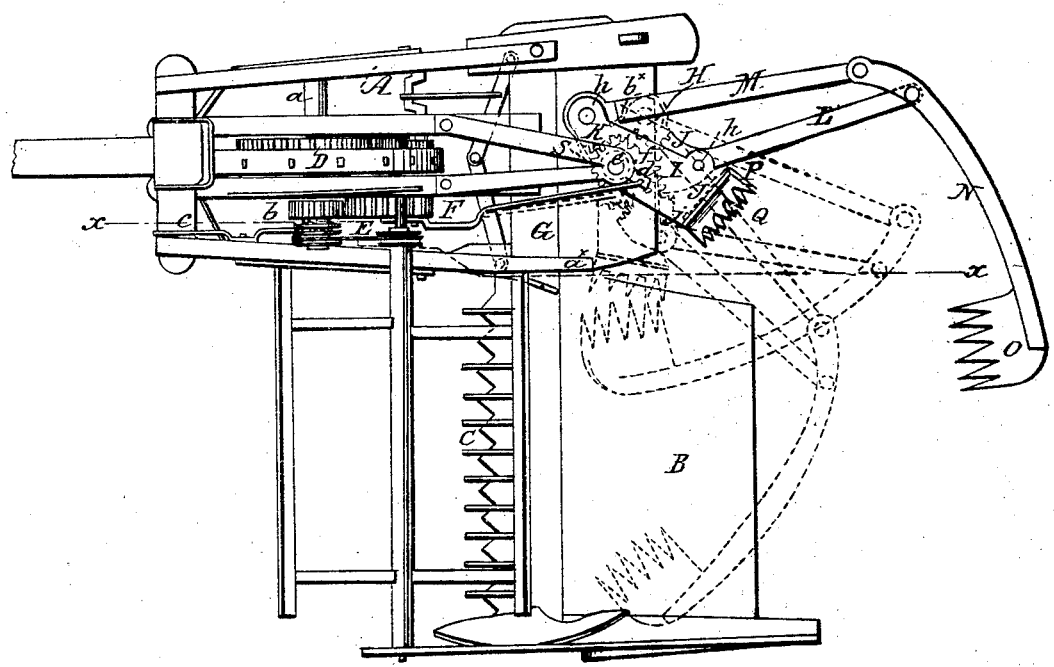

UNITED STATES PATENT OFFICE.

PETER S. CRAWFORD, OF MARENGO, ILLINOIS.

IMPROVEMENT IN RAKING ATTACHMENTS FOR HARVESTERS.

Specification forming part of Letters Patent No. 21,552, dated September 21, 1858.

*To all whom it may concern:*

Be it known that I, PETER S. CRAWFORD, of Marengo, in the county of McHenry and State of Illinois, have invented a new and Improved Raking Attachment for Reapers; and I do hereby declare that the following is a full, clear, and exact description of the same, reference being had to the annexed drawings, making a part of this specification, in which—

Figure 1 is a plan or top view of my invention applied to a reaper. Fig. 2 is a side view of my invention applied to a reaper, the latter being bisected vertically, as indicated by the line $xx$, Fig. 1. Fig. 3 is a detached end view of the discharging-rake.

Similar letters of reference indicate corresponding parts in the several figures.

This invention consists in a novel means employed for operating two rakes, as hereinafter fully shown and described, whereby the grain as it is cut is raked from the platform of the reaper and discharged in gavels on the ground at suitable points by a very economical mechanism, which may be readily applied and made to work efficiently in all cases.

To enable those skilled in the art to fully understand and construct my invention, I will proceed to describe it.

A represents the main frame of a reaper. B is the platform, which may be attached thereto in the usual manner, and C is the sickle at the front part of the platform, said sickle being driven by any proper means from the driving-wheel D, which is placed in the main frame A.

On the axle $a$ of the wheel D a pinion, $b$, is placed loosely and made to turn with the axle $a$, when desired, by means of a clutch, E, said clutch being operated by a lever, $c$. The pinion $b$ gears into a crank-wheel, F, which has a connecting-rod, G, attached to it. The outer end of the rod G is attached to an arm, $d$, which is placed on the upper end of the arbor $e$ of a double pinion, H. This pinion H is formed of two different-sized gears. One, $f$, is a portion of a circle, considerably smaller than the other, $g$, as shown clearly by dotted lines in Fig. 1. The gears $f$ $g$ are concentric with each other and the arbor $e$. The pinion H is fitted in a box, I, which is placed on the back part of the main frame A, the box being fitted loosely on the arbor $e$, which serves as an axis for the box.

J K are two sectors, which are placed or fitted in the box I and work loosely on axes $h\ h$, which pass vertically through the box I. The larger gear $g$, of the pinion H meshes into the sector J, and the smaller, $f$, meshes into the sector K. The sector J is somewhat larger than K, as shown clearly in Fig. 1. To the sector J a bar, L, is attached, and to the sector K a bar, M, is secured. The outer ends of the two bars L M are pivoted to a curved arm, N, to the end of which a rake, O, is attached.

To the end of the box I which is opposite to the rake O a rake, P, is permanently attached. To the rake P springs $i$ are attached. Q is a rake, which is attached by hinges $j$ to the end of the box I, directly over rake P, the rake Q bearing or resting against the springs $i$, as shown clearly in Fig. 2.

The operation of the device will be readily seen. As the machine is drawn along the wheel F will be rotated by the pinion $b$, when the latter is connected with the axle $a$ of the wheel D by means of the clutch E. The connecting-rod G vibrates the arm $d$, which turns the pinion H, and the latter actuates, through the medium of the sectors J K, the bars L M and rake O, the latter being moved as follows: When the rod G is moving forward, or in the direction indicated by arrow 1, the rake O is in a distended state, as shown in black, Fig. 1, and remains distended while the box I is turned around to the position shown in red, at which point its movement is arrested by a stop, $a^x$, and the rake by said movement of the box has assumed a position directly over the outer part of the platform. (Also shown in red.) The rake O is then moved through the medium of the gearing H J K, bars L M, and arm N, in a right line across the platform B toward the rakes P Q, (see red dotted lines,) and a gavel is gathered between the rakes O P. The rod G then returns or moves back, as indicated by arrow 2, and the box I is moved around in a backward direction until it is arrested by a stop, $b^x$, when the gearing H J K is again actuated and the rake again made to assume the position as shown in black, Fig. 1. When the rake O moves off from the rake Q—the last movement described—the gavel is thrown off from the rake P in consequence of the springs $i$ of the stationary rake P throwing outward rake Q.

It will of course be seen from the above description that the box I moves before the gearing, the friction of the latter causing such result, the gearing being actuated when the box I is stopped.

I do not claim broadly, or irrespective of the arrangement herein shown, a rake or system of rakes arranged or operated so that one will sweep over the platform and rake a gavel into the other rake, the latter assisting in discharging the gavel from the platform, for such device has been used and the plan carried out in various ways; but,

Having thus described my invention, what I claim as new, and desire to secure by Letters Patent, is—

1. The combination of the rakes O P, the former being attached to the box I, and the latter operated through the medium of the gearing H J K, placed within the box I, and the bars L M and arm N, the whole being arranged as and for the purpose set forth.

2. The supplemental or discharging rake Q, placed over the rake P, and used in connection with the springs $i$ of rake P, substantially as described.

PETER S. CRAWFORD.

Witnesses:
ASA W. SMITH,
HENRY CRAWFORD.